United States Patent
Stiers et al.

(10) Patent No.: US 8,875,167 B2
(45) Date of Patent: Oct. 28, 2014

(54) IMPLICIT MECHANISM FOR DETERMINING USER RESPONSE TO MEDIA

(75) Inventors: Todd Stiers, Berkeley, CA (US); Carl Ghoreichi, San Francisco, CA (US)

(73) Assignee: MobiTV, Inc., Emeryville, CA (US)

( * ) Notice: Subject to any disclaimer, the term of this patent is extended or adjusted under 35 U.S.C. 154(b) by 628 days.

(21) Appl. No.: 12/563,935

(22) Filed: Sep. 21, 2009

(65) Prior Publication Data

US 2011/0072448 A1  Mar. 24, 2011

(51) Int. Cl.
| | | |
|---|---|---|
| *H04H 60/33* | (2008.01) | |
| *H04N 7/173* | (2011.01) | |
| *H04N 21/442* | (2011.01) | |
| *H04N 21/658* | (2011.01) | |
| *H04N 21/258* | (2011.01) | |

(52) U.S. Cl.
CPC ..... *H04N 7/17318* (2013.01); *H04N 21/44204* (2013.01); *H04N 21/6582* (2013.01); *H04N 21/25891* (2013.01)
USPC .................................. 725/10; 725/9; 725/14

(58) Field of Classification Search
USPC ........................................... 725/9, 10, 13, 14
See application file for complete search history.

(56) References Cited

U.S. PATENT DOCUMENTS

| | | | |
|---|---|---|---|
| 2003/0101451 A1* | 5/2003 | Bentolila et al. ................ | 725/34 |
| 2007/0157242 A1* | 7/2007 | Cordray et al. ................. | 725/46 |
| 2009/0150919 A1* | 6/2009 | Lee et al. ........................ | 725/10 |
| 2009/0158308 A1 | 6/2009 | Weitzenfeld et al. | |
| 2009/0210290 A1 | 8/2009 | Elliott et al. | |
| 2009/0217315 A1 | 8/2009 | Malik et al. | |
| 2010/0280876 A1* | 11/2010 | Bowra ........................... | 705/10 |

OTHER PUBLICATIONS

International Search Report and Written Opinion mailed Nov. 1, 2010, for Application No. PCT/US2010/049610.

* cited by examiner

*Primary Examiner* — Nnenna Ekpo
(74) *Attorney, Agent, or Firm* — Kwan & Olynick LLP (57) ABSTRACT

Mechanisms are provided for implicitly determining user response to media content. User response may include satisfaction, interest, and engagement levels. User response is determined implicitly by measuring channel switching, channel switching frequency, duration of viewing time, content duration, etc. in a linear or non-linear manner. In one example, the viewing duration evaluated with the media content duration to generate an interest factor. A relative interest factor for the media content is generated by referencing interest factors for the user for other pieces of media content for the user. User responses can be analyzed to determine user attention span, make content recommendations, deliver selected versions of content, customize advertising for a user, etc.

20 Claims, 6 Drawing Sheets

IMPLICIT MECHANISM FOR DETERMINING USER RESPONSE TO MEDIA

DESCRIPTION OF RELATED ART

The present disclosure relates to a mechanism for determining user response to media.

DESCRIPTION OF RELATED ART

It is often desirable to determine user response to media materials. User response may involve satisfaction and interest levels. Some existing mechanisms allow a user to enter a rating after viewing the media. In some examples, content providers make use of ratings information in order to modify the types of media materials presented. Users may enter ratings using the same or outside channels. Users may also submit more detailed reviews of particular media experiences, typically by using outside channels.

However, mechanisms for determining user response to media materials are limited. Consequently, the techniques and mechanisms of the present invention provide improved mechanisms for determining user response to media.

OVERVIEW

Mechanisms are provided for implicitly determining user response to media content. User response may include satisfaction, interest, and engagement levels. User response is determined implicitly by measuring channel switching, channel switching frequency, duration of viewing time, content duration, etc. in a linear or non-linear manner. In one example, the viewing duration evaluated with the media content duration to generate an interest factor. A relative interest factor for the media content is generated by referencing interest factors for the user for other pieces of media content for the user. User responses can be analyzed to determine user attention span, make content recommendations, deliver selected versions of content, customize advertising for a user, etc.

These and other features of the present invention will be presented in more detail in the following specification of the invention and the accompanying figures, which illustrate by way of example the principles of the invention.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular devices such as mobile devices. However, it should be noted that the techniques and mechanisms of the present invention can be used with a variety of devices including general computing devices. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

The ability to accurately assess user response to media content such as video streams and clips can be very valuable. An accurate assessment of user interest, engagement, satisfaction, etc., with a particular program allows a content or service provider to customize programming, tailor advertising content, target product promotions, revise content streams, recommend additional content, etc. Providing targeted content on devices such as mobile devices can often be difficult.

Existing systems rely on explicit determination of interest and satisfaction levels. Some systems allow a user to manually enter feedback upon being exposed to media content. The user can rate the media content on a particular scale, provide written reviews, discuss the media content, etc. Users can also complete surveys and attend focus groups to provide insight on satisfaction and interest levels. Some of these response mechanisms occur immediately after viewing while other mechanisms may not occur until well after viewing of media materials.

Some providers monitor the number or percentages of viewers watching a particular channel or program. The numbers and percentages provide some rough estimate regarding the overall popularity of a program. They also show viewing trends and patterns. However, these numbers and percentages provide little information on individual interest or satisfaction levels. In some instances, viewers may be categorized by demographic and geographic groupings, and further insight can be obtained regarding the types of content suitable for particular audiences.

Other explicit mechanisms involve asking, polling, and viewer ranking However, explicit mechanisms have a variety of limitations. Explicit mechanisms require viewer cooperation and reporting accuracy. Some viewers may not want to admit interest in a particular program or may be more interested than they realize. Some viewers may not want to bother or may not have time to complete surveys and questionnaires. In some cases, the users least likely to complete a survey may be the ones most interested in a particular program. A variety of biases can render explicit mechanisms inaccurate at assessing individual user satisfaction, interest, and engagement levels.

Consequently, the techniques and mechanisms of the present invention provide implicit mechanisms for determining user response to media materials. User interest, engagement, and satisfaction can be passively determined using implicit mechanisms by monitoring user behavior or other indirect activity. According to various embodiments, implicit mechanisms measure user interest, satisfaction, and engagement related to a viewing or listening experience with or without supplemental explicit mechanisms.

According to various embodiments, the implicit measures of user view time, channel change frequency, clip duration, subsequent content viewed, average viewing duration, time of day, and clip metadata describing the content, etc., are all available for analysis. In particular embodiments, a simple linear model compares the user view time to the media clip duration in order to generate a single scalar value that is independent of media length. A user viewing a 90% of a clip can be deemed to be very interested while a user viewing 40% of a clip can be deemed to be moderately interested. In particular embodiments, satisfaction=function of (time viewed, clip duration)=time viewed/clip duration=X %

The linear approach generates a single number that can be used to compare a user's response to various pieces of content in a consistent manner. However, the linear approach has limited accuracy. With actual analytic data regarding real viewership patterns, it is possible to improve beyond this simple linear model. Rather than using a single linear model for all content, it is possible to vary the function itself based on content length.

According to various embodiments, a non-linear approach analyzes user view time and content duration and applies different functions based on the duration of the content. For example, a 2 minute long clip that was 50% viewed was scored lower than a 10 minute long clip that was viewed for 50% of its duration. In the mobile environment, a viewer who manages to get through the 50% of the 10 minute clip (5 minutes) may be more engaged than the user getting through 50% (1 minute) of the 2 minute clip. In some examples, a single non-linear function is applied that varies interest level scores based not just on the percentage of a clip viewed but on the clip duration.

Extension beyond a non-linear model is also possible. Other data such as content type, content quality, device class, time, location, etc., can be used to refine the function space of interest, engagement, and satisfaction. In other examples, different functions are applied depending on the type of content being viewed. Content specification dimension factors can also be applied to further refine models of interest, engagement, and satisfaction.

According to various embodiments, individually tailored measures of user response are enhanced by determining relative interest levels of a user for various pieces or types of content. Relative interest levels across users can also be determined. In some examples, a user typically watching 50%-75% of all video clips may be determined to be very interested in a 85% viewed video clip. By contrast, a user typically watching 10% of all 30 minute video clips may be determined to be very interested after watching 20% of a particular 30 minute video clip. In a large display environment, video clips may be left running even when individual viewers are not paying attention. However, for mobile devices such as cell phones, playback of a video clip is typically a good indicator of interest.

In particular embodiments, user viewing patterns are analyzed to determine user characteristics such as attention span. Users determined to have generally shorter attention spans may receive content tailored to short attention spans. A headline version of the news may be provided along with shortened commercial segments. Users having longer attention spans may be provided with more in depth versions of content. Content having scene changes that occur less frequently and less abruptly may be suggested for further viewing.

According to various embodiments, implicit mechanisms can include not only viewing length, but can also include mobile device location, accelerometer activity, audio-level/background, temperature, altitude, battery level, camera activity, local data storage, etc. The responses can be captured and provided to a system for further evaluation. In some examples, a device can detect when an individual is moving or running and content appropriate to that activity may be provided to the user.

Figure 1:
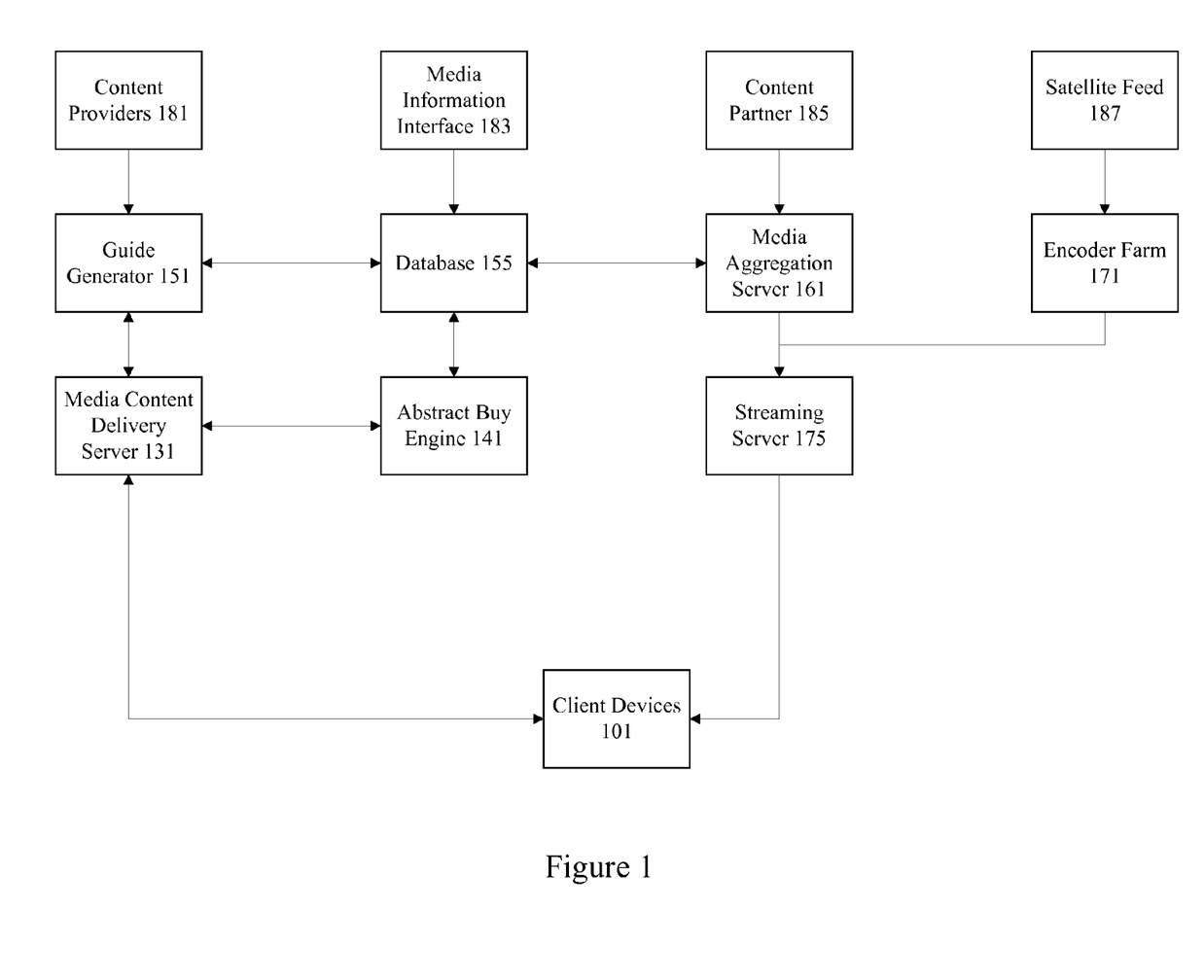
FIG. 1 illustrates a particular example of a network that can use the techniques and mechanisms of the present invention.

FIG. 1 is a diagrammatic representation showing one example of a network that can use the techniques of the present invention. According to various embodiments, media content is provided from a number of different sources 185. Media content may be provided from film libraries, cable companies, movie and television studios, commercial and business users, etc. and maintained at a media aggregation server 161. Any mechanism for obtaining media content from a large number of sources in order to provide the media content to mobile devices in live broadcast streams is referred to herein as a media content aggregation server. The media content aggregation server 161 may be clusters of servers located in different data centers. According to various embodiments, content provided to a media aggregation server 161 is provided in a variety of different encoding formats with numerous video and audio codecs. Media content may also be provided via satellite feed 157.

An encoder farm 171 is associated with the satellite feed 187 and can also be associated with media aggregation server 161. The encoder farm 171 can be used to process media content from satellite feed 187 as well as possibly from media aggregation server 161 into potentially numerous encoding formats. According to various embodiments, file formats include open standards MPEG-1 (ISO/IEC 11172), MPEG-2 (ISO/IEC 13818-2), MPEG-4 (ISO/IEC 14496), as well as proprietary formats QuickTime™, ActiveMovie™, and RealVideo™. Some example video codecs used to encode the files include MPEG-4 , H.263 , and H.264 . Some example audio codecs include Qualcomm Purevoice™ (QCELP), The Adaptive Multi-Narrow Band (AMR-NB), Advanced Audio coding (AAC), and AACPlus. The media content may also be encoded to support a variety of data rates. The media content from media aggregation server 161 and encoder farm 171 is provided as live media to a streaming server 175. In one example, the streaming server is a Real Time Streaming Protocol (RTSP) server 175. Media streams are broadcast live from an RTSP server 175 to individual client devices 101. A variety of protocols can be used to send data to client devices.

Possible client devices 101 include personal digital assistants (PDAs), cellular phones, personal computing devices, personal computers etc. According to various embodiments, the client devices are connected to a cellular network run by a cellular service provider. IN other examples, the client devices are connected to an Internet Protocol (IP) network. Alternatively, the client device can be connected to a wireless local area network (WLAN) or some other wireless network. Live media streams provided over RTSP are carried and/or encapsulated on one of a variety of wireless networks.

The client devices are also connected over a wireless network to a media content delivery server 131. The media content delivery server 131 is configured to allow a client device 101 to perform functions associated with accessing live media streams. For example, the media content delivery server allows a user to create an account, perform session identifier assignment, subscribe to various channels, log on, access program guide information, obtain information about media content, etc. According to various embodiments, the media content delivery server does not deliver the actual media stream, but merely provides mechanisms for performing operations associated with accessing media. In other implementations, it is possible that the media content delivery server also provides media clips, files, and streams. The media content delivery server is associated with a guide generator 151. The guide generator 151 obtains information from disparate sources including content providers 181 and media information sources 183. The guide generator 151 provides program guides to database 155 as well as to media content delivery server 131 to provide to client devices 101.

According to various embodiments, the guide generator 151 obtains viewership information from individual client devices. In particular embodiments, the guide generation 151 compiles viewership information in real-time in order to generate a most-watched program guide listing most popular programs first and least popular programs last. The client device 101 can request program guide information and the most-watched program guide can be provided to the client device 101 to allow efficient selection of video content. According to various embodiments, guide generator 151 is connected to a media content delivery server 131 that is also associated with an abstract buy engine 141. The abstract buy engine 141 maintains subscription information associated with various client devices 101. For example, the abstract buy engine 141 tracks purchases of premium packages.

The media content delivery server 131 and the client devices 101 communicate using requests and responses. For example, the client device 101 can send a request to media content delivery server 131 for a subscription to premium content. According to various embodiments, the abstract buy engine 141 tracks the subscription request and the media content delivery server 131 provides a key to the client device 101 to allow it to decode live streamed media content. Similarly, the client device 101 can send a request to a media content delivery server 131 for a most-watched program guide for its particular program package. The media content delivery server 131 obtains the guide data from the guide generator 151 and associated database 155 and provides appropriate guide information to the client device 101.

Although the various devices such as the guide generator 151, database 155, media aggregation server 161, etc. are shown as separate entities, it should be appreciated that various devices may be incorporated onto a single server. Alternatively, each device may be embodied in multiple servers or clusters of servers. According to various embodiments, the guide generator 151, database 155, media aggregation server 161, encoder farm 171, media content delivery server 131, abstract buy engine 141, and streaming server 175 are included in an entity referred to herein as a media content delivery system.

Figure 2:
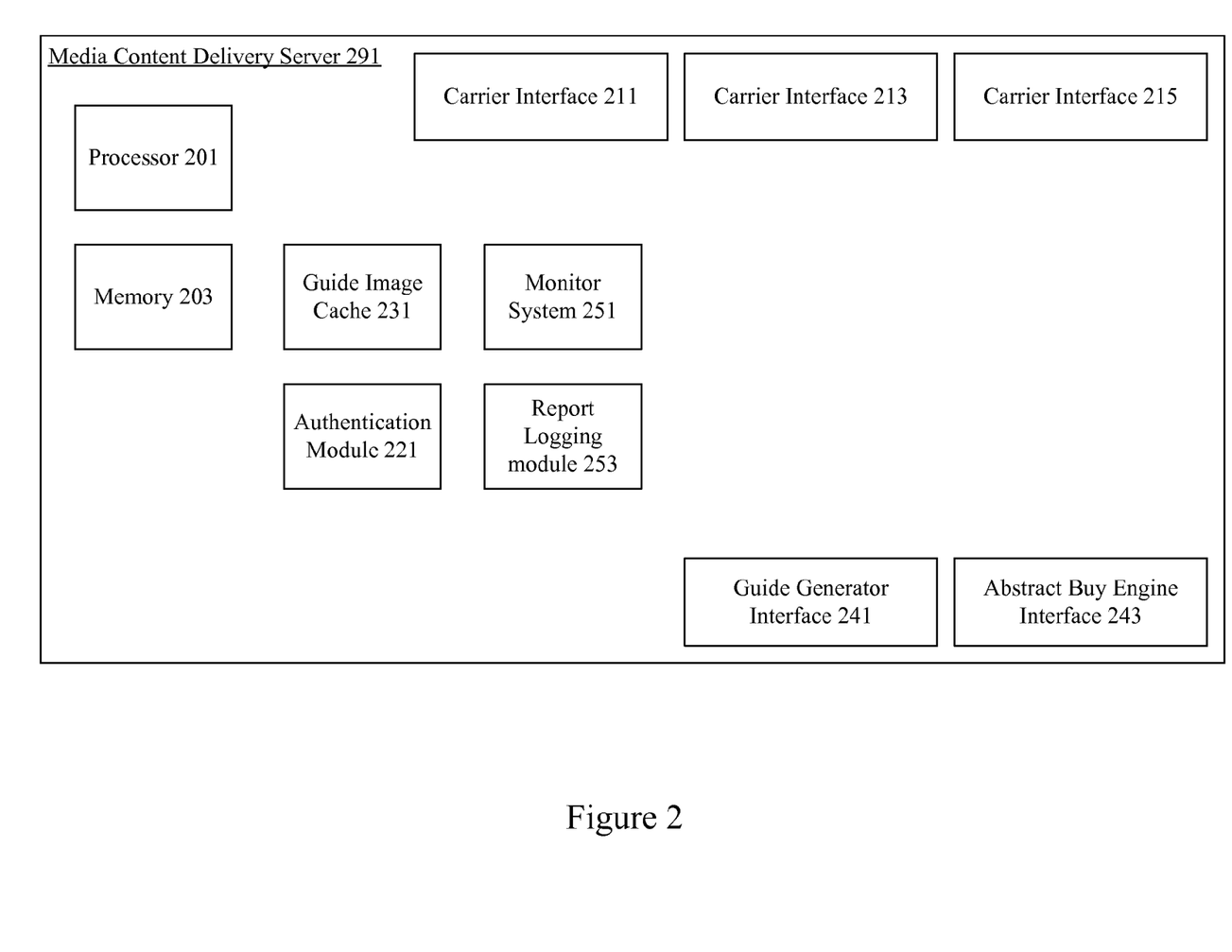
FIG. 2 illustrates a particular example of a content delivery system.

FIG. 2 is a diagrammatic representation showing one example of a media content delivery server 291. According to various embodiments, the media content delivery server 291 includes a processor 201, memory 203, and a number of interfaces. In some examples, the interfaces include a guide generator interface 241 allowing the media content delivery server 291 to obtain program guide information. The media content delivery server 291 also can include a program guide cache 231 configured to store program guide information and data associated with various channels. The media content delivery server 291 can also maintain static information such as icons and menu pages. The interfaces also include a carrier interface 211 allowing operation with mobile devices such as cellular phones operating in a particular cellular network. The carrier interface allows a carrier vending system to update subscriptions. Carrier interfaces 213 and 215 allow operation with mobile devices operating in other wireless networks. An abstract buy engine interface 243 provides communication with an abstract buy engine that maintains subscription information.

An authentication module 221 verifies the identity of mobile devices. A logging and report generation module 253 tracks mobile device requests and associated responses. A monitor system 251 allows an administrator to view usage patterns and system availability. According to various embodiments, the media content delivery server 291 handles requests and responses for media content related transactions while a separate streaming server provides the actual media streams. In some instances, a media content delivery server 291 may also have access to a streaming server or operate as a proxy for a streaming server. But in other instances, a media content delivery server 291 does not need to have any interface to a streaming server. In typical instances, however, the media content delivery server 291 also provides some media streams. The media content delivery server 291 can also be configured to provide media clips and files to a user in a manner that supplements a streaming server.

Although a particular media content delivery server 291 is described, it should be recognized that a variety of alternative configurations are possible. For example, some modules such as a report and logging module 253 and a monitor 251 may not be needed on every server. Alternatively, the modules may be implemented on another device connected to the server. In another example, the server 291 may not include an interface to an abstract buy engine and may in fact include the abstract buy engine itself. A variety of configurations are possible.

Figure 3:
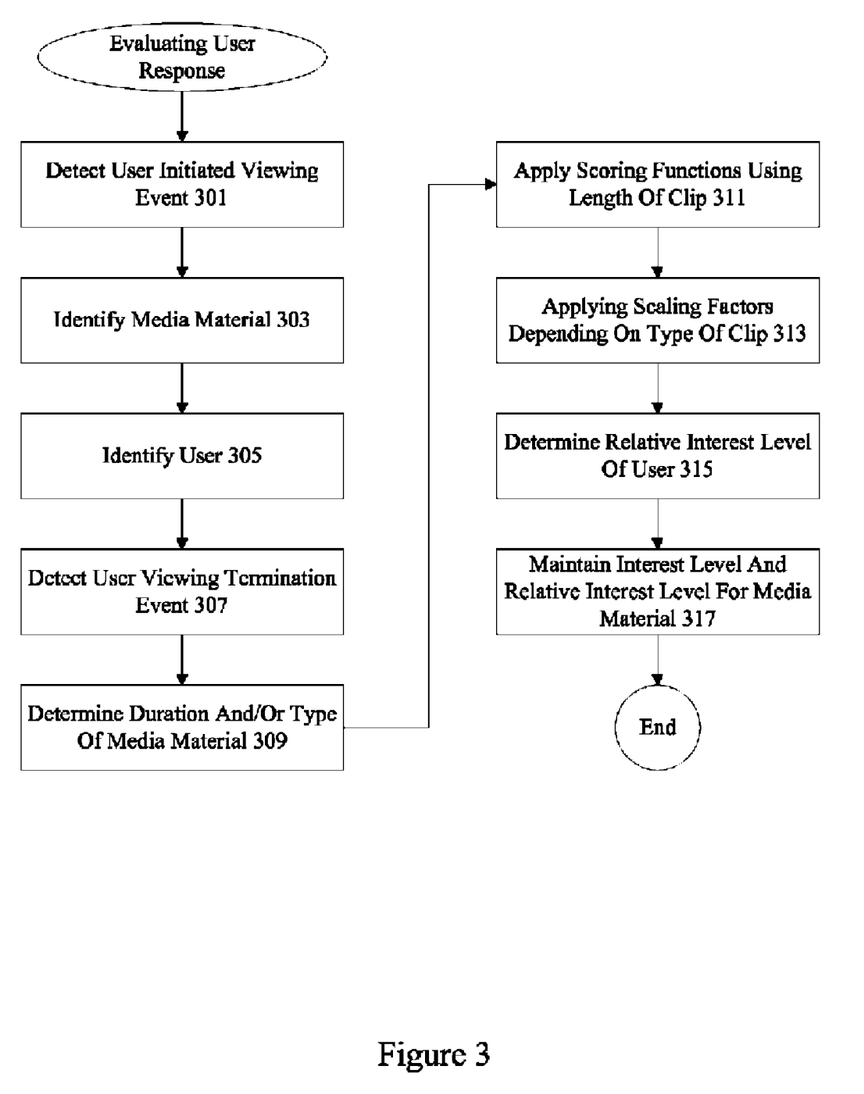
FIG. 3 illustrates a particular example of evaluating user response.

FIG. 3 illustrates one example of a technique for evaluating user response to media materials. At 301, a user initiated viewing event is detected. The user initiated viewing event may be a change to a particular channel on a mobile device or the selection and playback of a particular video clip. At 303, the media material is identified. At 305, the user is identified. At 307, a user viewing termination event is detected. According to various embodiments, a user viewing termination event may be a change to a different channel, selection and playback of a different video clip, playback stoppage, navigation to a different site or window, etc. According to various embodiments, the duration and/or type of the media material is determined at 309. The duration and/or type of the media material may determine what function is applied to generate a metric for user response to the material.

In one example, a model uses the following determinations. Media material is scored on a rating from 0 to 5 with 5 being very likeable based on the percentage of a clip viewed.

In particular examples, different scoring functions are applied based on the length of the clip at 311. At 313, scaling factors can be applied depending on the type of clip. At 315, the relative interest level of the user for a particular program is determined by comparing the current determined interest level with interest levels determined for other programs. In some examples, a user relative interested level may be determined to be very high upon watching 15 minutes of a 30 minute clip if the user typically only watches one or two minutes of most 30 minute clips. In particular embodiments, the interest level along with the relative interest level for a particular piece of content is maintained in a user profile database at 317. According to various embodiments, the interest level incorporates a measure of satisfaction and engagement. The relative interest level is measured relative to the user's own interest in other types of content.

Figure 4:
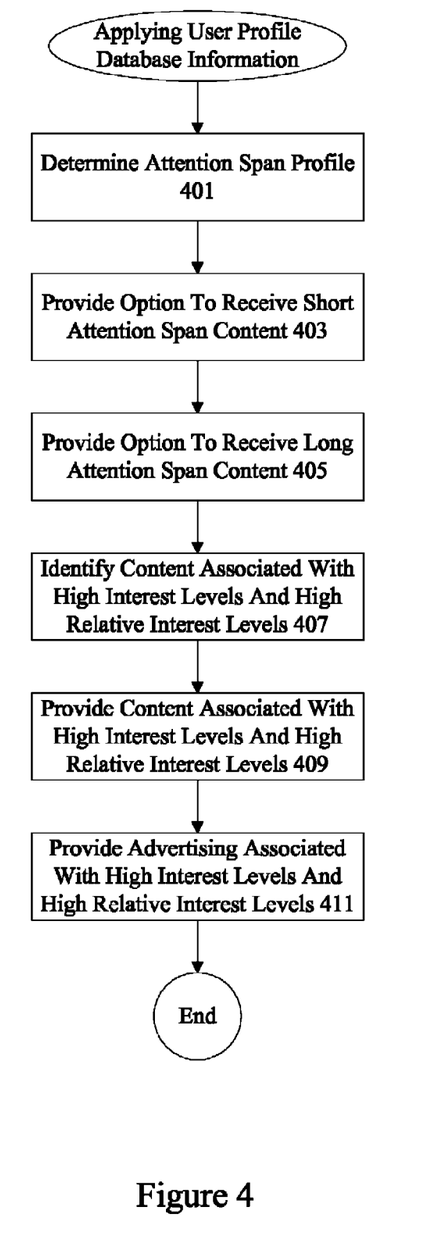
FIG. 4 illustrates a particular example of applying user profile database information.

FIG. 4 illustrates one mechanism for applying user profile database information. At 401, an attention span profile for the user is generated. According to various embodiments, the attention span profile is generated when the user is determined to have predominantly brief viewing patterns. In some example, a user viewing less than 25% of 95% of all clips watched for at least 10 seconds is determined to have a short attention span profile. At 403, the user is provided with the option to receive short attention span profile content. According to various embodiments, the user is provided shortened versions of video clips, abbreviated versions of advertising, time accelerated versions of content such as content played at 140% speed, or headline news instead of standard news programs. In particular examples, a user viewing more than 95% of at least 75% of all clips watched for at least 10 seconds is determined to have a long attention span. According to various embodiments, the user is provided with the option to receive long attention span profile content at 405 if the user is determined to have a long attention span profile. More documentaries and in depth reporting may be suggested. Fewer but longer commercials may also be provided in place of more frequent but shorter commercials.

At 407, content types and tags associated with high interest levels and/or high relative interest levels are identified. At 409, similarly typed and/or tagged content is suggested for users having high interest levels and high relative interest levels for content of a particular type or content having particular tags. In particular embodiments, content is tagged to allow efficient identification of content characteristics. Tags may include subject matter, rating, violence level, educational value, etc. According to various embodiments, users determined to have high implicit interest levels in particular types of content are provided with more similarly tagged content. At 411, similarly typed and/or tagged advertising is provided to users having particular interest levels or relative interest levels. In some embodiments, relative interest level information can be combined with demographic data, location information, and personal preferences to customize and enhance user viewing experiences.

Figure 5:
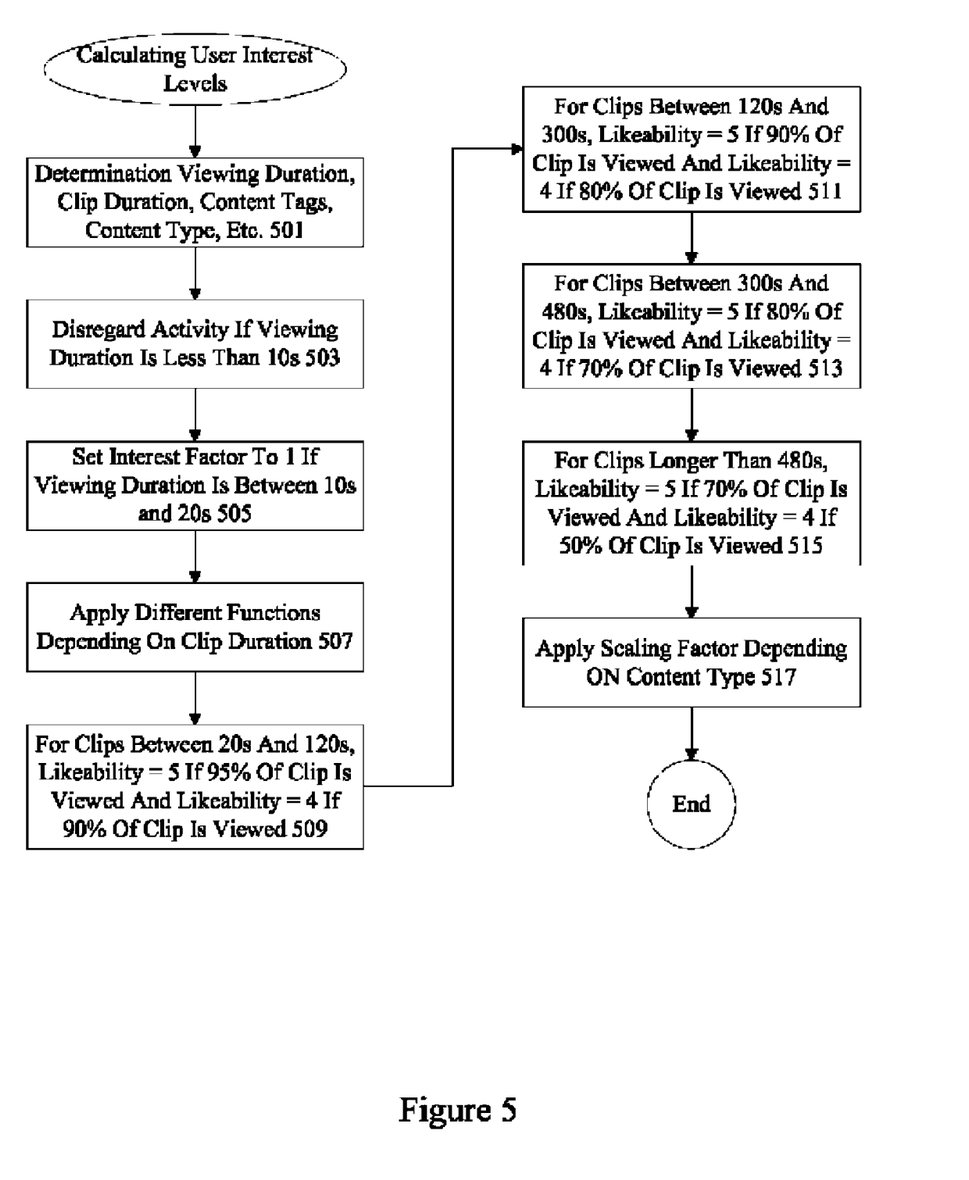
FIG. 5 illustrates a particular example of calculating user interest levels.

FIG. 5 illustrates a particular embodiment for calculating interest levels. At 501, the duration of viewing, clip duration, and content tags and/or type are determined. In some examples, implicit factors can be used to filter out content having particular tags and/or types. At 503, if the viewing duration is less than 10 s, the activity is disregarded. An extremely short viewing duration may merely be indicative of an intermediate channel change toward a destination channel. At 505, if the viewing duration is between 10 s and 20 s, the emotional response or interest factor is set to 1 on a scale of 1 to 5, with 5 representing the highest level of interest. At 507, different functions are applied depending on clip duration.

According to various embodiments, for clips between 20 s and 120 s, an emotional response score of 5 is assigned if 95% of the clip is viewed and an emotional response score of 4 is assigned if 90% of the clip is viewed at 509. For clips between 120 s and 300 s, an emotional response score of 5 is assigned if 90% of the clip is viewed and an emotional response score of 4 is assigned if 80% of the clip is viewed at 511. For clips between 300 s and 480 s, an emotional response score of 5 is assigned if 80% of the clip is viewed and an emotional response score of 4 is assigned if 70% of the clip is viewed at 513. For clips longer than 480 s, an emotional response score of 5 is assigned if 70% of the clip is viewed and an emotional response score of 4 is assigned if merely half of the clip is viewed at 515.

```
if (viewduration < 10s){end;}
if (10s <= viewduration < 20s){emotional response =1;}
if (20s <= clipduration < 120s){
    if (viewduration/clipduration > 95%){emotional response = 5};
    else if (viewduration/clipduration > 90%){emotional response = 4};
    else {emotional response = 3};
}
if (120s <= clipduration < 300s){
    if (viewduration/clipduration > 90%){emotional response = 5};
    else if (viewduration/clipduration > 80%){emotional response = 4};
    else {emotional response = 3};
}
if (300s <= clipduration < 480s){
    if (viewduration/clipduration > 80%){emotional response = 5};
    else if (viewduration/clipduration > 70%){emotional response = 4};
    else {emotional response = 3};
}
if (480s <= clipduration){
    if (viewduration/clipduration > 70%){emotional response = 5};
    else if (viewduration/clipduration > 50%){emotional response = 4};
    else {emotional response = 3};
}
```

It should be noted that a variety of linear and non-linear functions can be applied that account for duration as well as the percentage of a clip watched. In some examples, instead of applying different functions, a single curve function can be applied. It should be noted that the exact values, percentages, and scaling systems can be varied widely.

Extension beyond is possible by applying still more variation to the model. For example, other data can be applied that can further refine the function space of emotional response. Other data may include content type, content quality, device class/quality/size, time of day, location, weather, etc.

In some examples, different factors are applied to scoring depending on the content type at 517. For example, if the content is NEWS, the interest factor is multiplied by 1.1%. If the content is MUSIC, the interest factor is multiplied by 0.75%.

Figure 6:
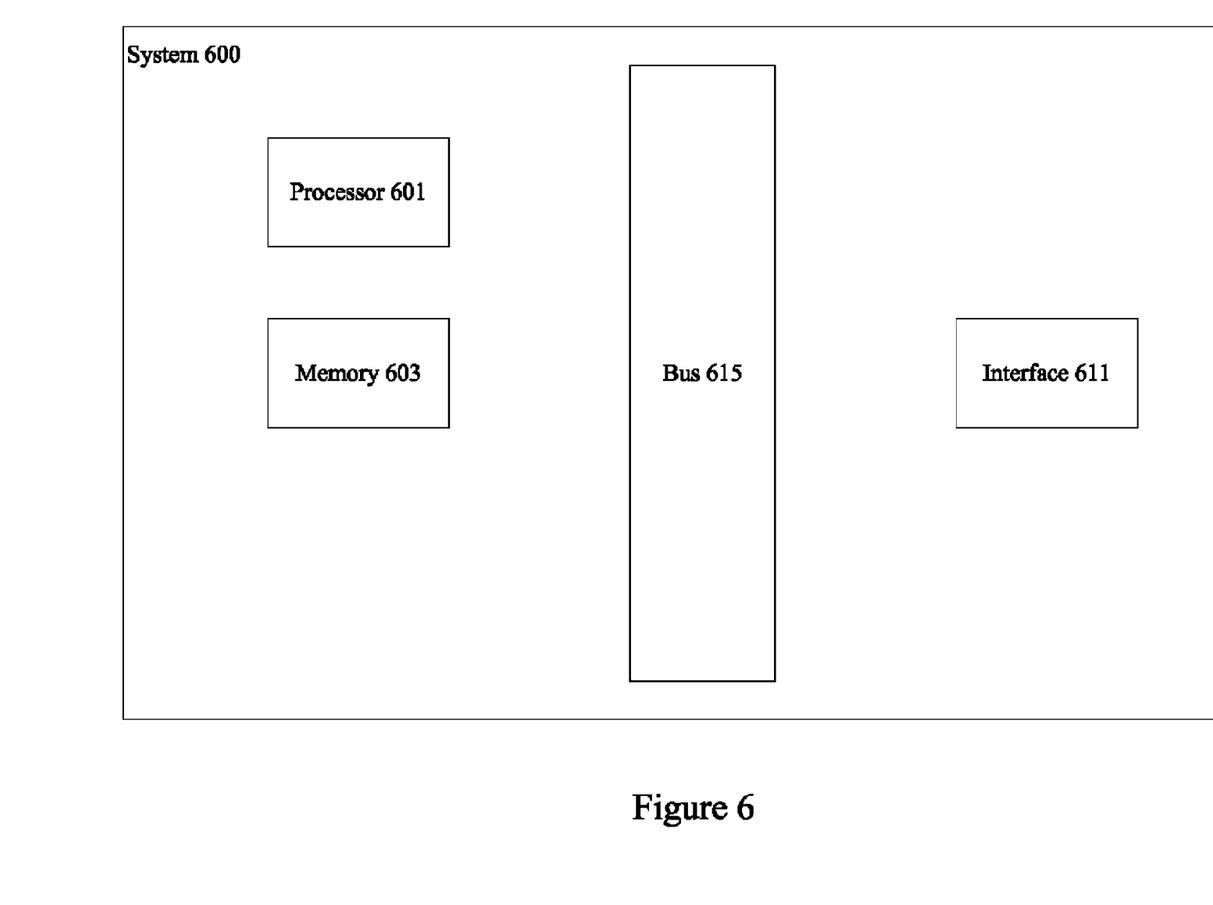
FIG. 6 illustrates a particular example of system.

FIG. 6 illustrates one example of a server that can be used to evaluated user response. According to particular embodiments, a system 600 suitable for implementing particular embodiments of the present invention includes a processor 601, a memory 603, an interface 611, and a bus 615 (e.g., a PCI bus or other interconnection fabric) and operates as a streaming server. When acting under the control of appropriate software or firmware, the processor 601 is responsible for modifying and transmitting live media data to a client. Various specially configured devices can also be used in place of a processor 601 or in addition to processor 601. The interface 611 is typically configured to end and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 600 is a content server that also includes a transceiver, streaming buffers, and a program guide database. The content server may also be associated with subscription management, logging and report generation, and monitoring capabilities. In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the content server 691 handles requests and responses for media content related transactions while a separate streaming server provides the actual media streams.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
    detecting a plurality of user initiated viewing events, each viewing event associated with a respective user viewing respective media content;
    for each of the plurality of user initiated viewing events, detecting a respective user viewing termination event associated with the respective media content;
    for each of the plurality of user initiated viewing events, determining a respective viewing duration for the respective media content, a respective total duration for the respective media content, and a respective designated content type for the media content by using a processor, the respective designated content type being one of a plurality of content types capable of being associated with the respective media content, the respective designated content type indicating a subject matter associated with the respective media content;
    applying a first set of criteria to the designated content type associated with a first one of the viewing events, the first set of criteria indicating a first type of subject matter associated with the media content;
    applying a second set of criteria to the designated content type associated with a second one of the viewing events, the second set of criteria indicating a second type of subject matter associated with the media content;
    for each of the first and second viewing events, calculating a respective emotional response factor using the respective viewing duration and the respective total duration, wherein the respective emotional response factor is calculated using different functions depending on total duration and designated content type;
    for each of the first and second viewing events, maintaining the respective emotional response factor with a respective identifier associated with the respective media content in a data storage device.

2. The method of claim 1, wherein the media content is associated with a plurality of tags.

3. The method of claim 2, wherein the plurality of tags include type and rating.

4. The method of claim 1, wherein the emotional response factor for the media content is compared to a plurality of emotional response factors for a plurality of pieces of media content for the user in order to determine a relative emotional response factor.

5. The method of claim 1, wherein the emotional response factor is used to generate media content recommendations.

6. The method of claim 5, wherein content similar to media content having high emotional response ratings is presented in media content recommendations.

7. The method of claim 1, wherein the emotional response factor is used to select user specific advertising.

8. The method of claim 7, wherein advertising associated with media content having high emotional response ratings is presented to the user.

9. The method of claim 1, wherein an attention span indicator is generated for the user.

10. The method of claim 9, wherein a short attention span determination is used to provide shortened clips and commercials to the user.

11. The method of claim 9, wherein a long attention span determination is used to provide more in depth clips and commercials to the user.

12. A system, comprising:
    an interface to detect a plurality of user initiated viewing events each associated with a respective user viewing respective media content as well as a plurality of user viewing termination events associated with the respective media content;
    a processor to determine, for each of the plurality of user initiated viewing events, a respective viewing duration for the media content, a respective total duration for the media content, and a respective designated content type for the media content and calculate a respective emotional response factor using the respective viewing duration and the respective total duration, wherein the respective designated content type is one of a plurality of content types capable of being associated with the respective media content, wherein the respective designated content type indicates a respective subject matter associated with the respective media content, wherein the respective emotional response factor is calculated using different functions depending on total duration and designated content type, wherein the processor is further configured to apply a first set of criteria to the designated content type associated with a first one of the viewing events and apply a second set of criteria to the designated content type associated with a second one of the viewing events, the first set of criteria indicating a first type of subject matter associated with the media content and the second set of criteria indicating a second type of subject matter associated with the media content;

data storage to maintain, for each of the first and second viewing events, the respective emotional response factor with a respective identifier associated with the respective media content.

13. The system of claim 12, wherein the media content is associated with a plurality of tags.

14. The system of claim 13, wherein the plurality of tags include type and rating.

15. The system of claim 12, wherein the emotional response factor for the media content is compared to a plurality of emotional response factors for a plurality of pieces of media content for the user in order to determine a relative emotional response factor.

16. The system of claim 12, wherein the emotional response factor is used to generate media content recommendations.

17. The system of claim 16, wherein content similar to media content having high emotional response ratings is presented in media content recommendations.

18. The system of claim 12, wherein the emotional response factor is used to select user specific advertising.

19. The system of claim 18, wherein advertising associated with media content having high emotional response ratings is presented to the user.

20. A non-transitory computer readable storage medium recorded with a computer readable program for making a computer execute a method of processing information, the method comprising:

detecting a plurality of user initiated viewing events, each viewing event associated with a respective user viewing respective media content;

detecting, for each of the plurality of user initiated viewing events, a respective user viewing termination event associated with the respective media content;

determining, for each of the plurality of user initiated viewing events, a respective viewing duration for the respective media content, a respective total duration for the respective media content, and a respective designated content type for the media content by using a processor, the respective designated content type being one of a plurality of content types capable of being associated with the respective media content, the respective designated content type indicating a subject matter associated with the respective media content;

applying a first set of criteria to the designated content type associated with a first one of the viewing events, the first set of criteria indicating a first type of subject matter associated with the media content;

applying a second set of criteria to the designated content type associated with a second one of the viewing events, the second set of criteria indicating a second type of subject matter associated with the media content;

calculating, for each of the first and second viewing events, a respective emotional response factor using the respective viewing duration and the respective total duration, wherein the respective emotional response factor is calculated using different functions depending on total duration and designated content type;

maintaining, for each of the first and second viewing events, the respective emotional response factor with a respective identifier associated with the respective media content.

\* \* \* \* \*